J. M. DODGE.
CHAIN.
APPLICATION FILED APR. 8, 1913.
1,086,146.  Patented Feb. 3, 1914.
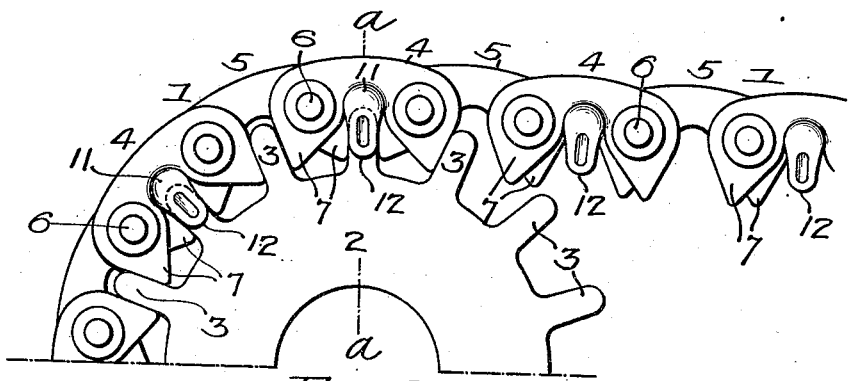
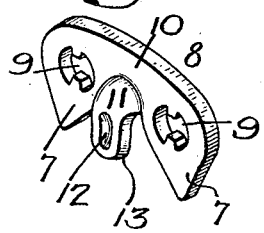
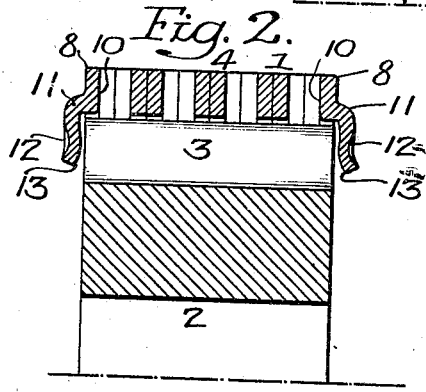
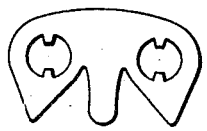
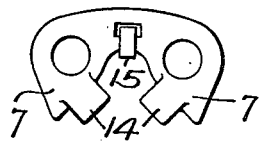
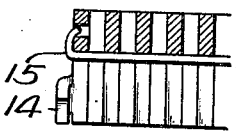
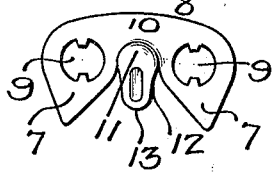
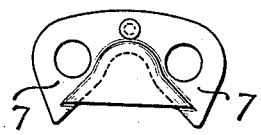
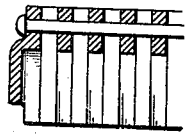
Witnesses—
Wills A Burrows
Charles H. York
Inventor
James M. Dodge.
by his Attorneys
Howson Howson

UNITED STATES PATENT OFFICE.

JAMES M. DODGE, OF PHILADELPHIA, PENNSYLVANIA.

CHAIN.

1,086,146.  Specification of Letters Patent.  Patented Feb. 3, 1911.

Application filed April 8, 1913.  Serial No. 759,703.

*To all whom it may concern:*

Be it known that I, JAMES M. DODGE, a citizen of the United States, residing in Philadelphia, Pennsylvania, have invented certain Improvements in Chains, of which the following is a specification.

My invention relates to certain improvements in chains of the type in which teeth on the chain mesh with the teeth on a sprocket wheel, and also of the type in which the links are made of a series of plates arranged side by side.

The main object of my invention is to dispense with flanges or ribs on the wheel for holding the chain in proper alinement with the wheel.

A further object of the invention is to form an extension on the outer plates of the chain, which will overlap the teeth of the sprocket wheel and thus confine the chain laterally on the wheel.

In the accompanying drawings Figure 1, is a side view of sufficient of a chain and sprocket wheel to illustrate my invention; Fig. 2, is a sectional view on the line *a—a*, Fig. 1; Fig. 3, is a detached perspective view of one of the link plates illustrating my invention; Fig. 4, is a view of the link blank previous to being bent; Fig. 5, is a view of the link ready to be applied to the chain; Figs. 6 and 7, are views illustrating modifications of the invention, in which overhanging lips are formed on the teeth of the chain; and Figs. 8 and 9, are views illustrating another modification of the invention.

Referring to the drawings, 1 is the chain and 2 is the sprocket wheel. The sprocket wheel has a series of teeth 3 spaced apart as shown, and the chain is made of a series of links 4 and 5 connected together by pivot pins 6. Each of the links is made of a series of plates arranged side by side and having teeth 7 which extend into the spaces between the teeth of the sprocket wheel. This type of chain is now manufactured and is used as a drive chain, and one or both of the sprocket wheels, around which the chain passes, is usually provided with side flanges or a rib, preventing the chain moving laterally on the sprocket wheel. The flanges, however, are objectionable in that they tend to wear away the pivot pins, or other fastenings, which retain the assembled plates. They also form pockets for the accumulation of dirt.

It has been suggested that blank plates be provided and secured to the outside of the chain links, which extend over the edges of the teeth of the sprocket wheels, but these plates are objectionable, as they add materially to the weight without increasing the bearing surface of the chain and they make the chain out of balance, as they add two additional blank plates to the link of the chain which already has one extra plate.

By my invention, I form a lip on the outside plate of alternate links in the present instance, which overlap the ends of alternate sprocket teeth.

Referring to Fig. 3, 8 is a plate having openings 9 for the pivot and having teeth 7 spaced apart and connected by the bridge piece 10, which extends over the sprocket teeth 3 of the chain. 11 is a lip projecting laterally from the bridge piece 10 of the plate and having a downward projection 12 which extends outside of the line of the outer surface of the plate, so that, when the plates are assembled, as in Figs. 1 and 2, this lip projects over the end of the sprocket teeth 3 and, as one of these lipped plates 8 is located on each end of the links 4, they limit the lateral movement of the chain on the sprocket wheel. The end 13 of the lip is preferably turned out, as illustrated in Fig. 2, so that it will readily pass over the end of the sprocket wheel, and is also indented so as to form a rounded rib on the inner surface, which bears against the end of the sprocket tooth; this rib also strengthens the lip.

It will be noticed that the distance between the two lips on opposite sides of the sprocket wheel is greater than the width of the sprocket wheel. This allows the chain to have a limited amount of lateral movement, which is of advantage in this type of chain as it distributes the wear evenly over the entire surface of the sprocket teeth.

The lip is made, in the present instance, by forming a blank, as illustrated in Fig. 4, and using the waste metal, which is usually cut away, to form the lip, and by pressing this lip out of line with the plate, as in Figs. 3 and 5, it will readily pass over the ends of the sprocket teeth. In some instances, the lip may be formed by welding a separate piece onto the link plate, but I prefer to make it an integral part of the plate, bending the lip out of line of the teeth, as shown.

In Figs. 6 and 7, I have illustrated a modification of the invention, in which a lip 14 is formed on the inner edge of each tooth of the plate; the lips being out of line with the teeth so as to extend over the end of the teeth of the sprocket wheel. This allows for the location of the fastening 15 in the space between the teeth.

In Figs. 8 and 9, I have illustrated another modification in which the plate is made in a solid piece shaped to form the two teeth and an extended lip outside the line of the teeth.

It will be seen that a chain made with any one of the plates described will accomplish the object of my invention, as the projecting lip in every instance forms a part of one of the active link elements.

I claim:—

1. The combination in a chain made of a series of pivotally connected links, each link consisting of a series of plates arranged side by side, the outer plates of alternate links having lips offset from the plane of the body and arranged to project over the end of the teeth of the sprocket wheel.

2. A toothed plate of a chain link having a projecting lip offset from the plane of the body of the link so that when the plates are assembled the lip will project over the end of a tooth of a sprocket wheel.

3. A toothed plate forming an element of a chain link and having two teeth spaced apart and connected by a bridge; and an integral lip projecting laterally from the bridge and extending parallel with the face of the plate so as to bear against the end of a sprocket wheel engaged by one of the teeth of the plate.

4. A toothed plate of a chain having a central projecting lip offset from the plane of the body of the plate and ribbed so as to form a curved bearing surface to contact with a tooth of a sprocket wheel.

5. The combination of a toothed chain and a toothed sprocket wheel, the alternate links of the chain having outer plates provided with lips offset from the plane of the body of the links and extending over the end of the teeth of the sprocket wheel.

In testimony whereof, I have signed my name to this specification, in the presence of two subscribing witnesses.

JAMES M. DODGE.

Witnesses
Wm. E. Shupe,
Wm. A. Barr.